S. CASSIDAY, J. B. FORD & C. S. SNEAD.
TABLE UPON WHICH TO ROLL PLATE-GLASS.
No. 175,419. Patented March 28, 1876.
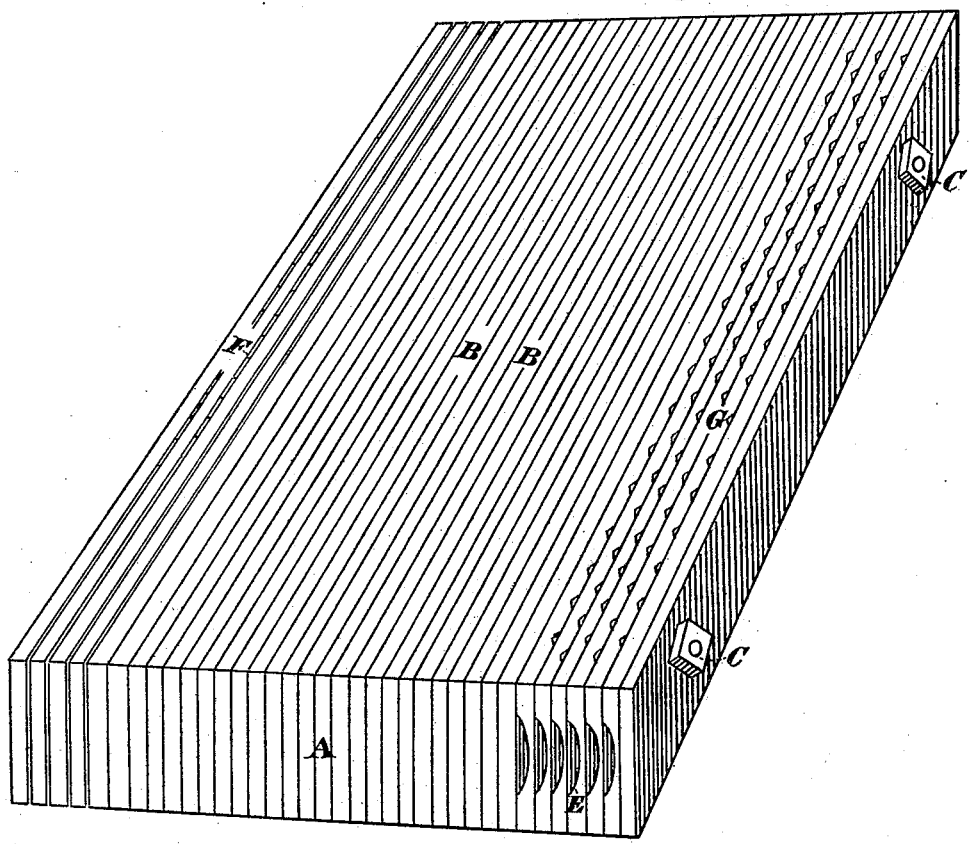
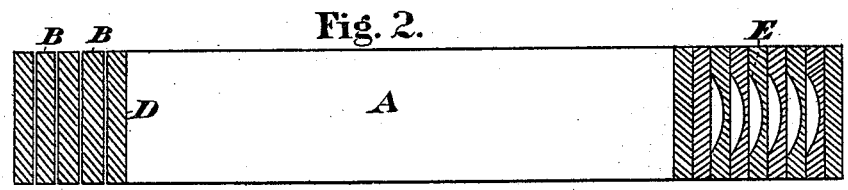
WITNESSES.
Frank Pardon.
W. W. Dawson
INVENTOR.
Samuel Cassiday
John B. Ford
Charles S. Snead
by J. G. Hewitt, Attorney.

UNITED STATES PATENT OFFICE.

SAMUEL CASSIDAY, JOHN B. FORD, AND CHARLES S. SNEAD, OF LOUISVILLE, KENTUCKY.

IMPROVEMENT IN TABLES UPON WHICH TO ROLL PLATE-GLASS.

Specification forming part of Letters Patent No. 175,419, dated March 28, 1876; application filed November 24, 1875.

*To all whom it may concern:*

Be it known that we, SAMUEL CASSIDAY, JOHN B. FORD, and CHARLES S. SNEAD, of the city of Louisville, in the county of Jefferson and State of Kentucky, have invented a certain new and useful Improvement in Tables upon which to roll Plate-Glass; and we do hereby declare that the following is a full, clear, and exact description thereof, which will enable others skilled in the art to make and use the same, reference being had to the accompanying drawings, forming part of this specification, in which—

Figure 1 is a perspective view of the table, showing its general construction. Fig. 2 is a sectional view, showing the shape of the bars composing the table.

Similar letters of reference indicate corresponding parts of the drawing.

This our invention relates to improvements in tables upon which to roll plate-glass, but more especially to a table made in sections, the object of which is to provide a table that will be cheap, durable, and easily constructed, and at the same time susceptible of being ventilated on the under side in such a manner as to prevent imperfections in the sheets in rolling, and also to bring it within the capacity of ordinary manufacturers to construct it, which is done by means of metal bars of suitable size, length, and shape, placed side by side, so as to form sections of sufficient width to be easily handled in planing, after which these sections are again placed side by side, until a sufficient number of the bars have been used to make the table of the required width, when they are secured firmly together in that position by means of dowel-bolts extending through the entire table, with screw-nuts on the ends, which ends may be made to extend through the table sufficient to receive a hollow washer next to the table, in order to answer as a base for gum or other springs between it and a flat bar of iron under the nuts or heads of the bolts, in order to relieve them in case of expansion of the table when heated by the glass or otherwise.

Referring to the drawings, A is the table, and B are the separate bars of which it is composed, all of which are made of wrought-iron or other metals, and in form as shown in the drawing. These bars, in order to constitute a table, are placed side by side, until a sufficient number is used to form a section large enough to be easily handled, after which they are securely fastened in that position by means of bolts or otherwise, and then placed upon an iron planer and dressed perfectly level and true on the top surface, leaving only slight corrugations made by the tool in planing, which is intended to assist in the process of ventilation, after which a sufficient number of the bars or sections are placed together to form a table of the required size, and secured in that position by means of two, three, or more dowel-bolts extending through the entire table, and, if necessary, the ends may be made to extend through sufficiently to receive a hollow washer next to the table, in order to answer as a base for suitable springs between it and a flat bar under the nuts, to relieve the bolts from the strain caused by the expansion of the table when the heated glass is poured upon it. C C are the dowel-bolts, all of which are made of round iron and inserted in the table, as shown in the drawing. These bars constituting the table may be made in any suitable form, either plain, as shown at D, or with flanges on the edges, or hollowed out on one or both sides, as shown at E in the drawings; and in order to ventilate the table where the plain bars are used, a small opening is left between them by inserting thin strips of metal, as shown at F, but where the hollow bars are used small grooves are cut in the edges to form vent-holes, as shown at G in the drawing; and, if necessary, in order to further assist in ventilating the table, an exhaust fan-blower, may be used in any suitable manner in the furnace under it.

Having thus fully described the nature and object of this our invention, therefore what we claim as new, and desire to secure by Letters Patent, is—

1. A table for use in rolling plate-glass, constructed of sections or bars of metal detachably secured together, whereby the size or width of said table may be varied at will, or as necessity requires, substantially as described.

2. A table for use in rolling plate-glass, constructed of sections or bars of metal detachably secured tog ther, and having ventilating spaces or devices, substantially as described.

SAMUEL CASSIDAY.
     CHARLES S. SNEAD.
     JOHN B. FORD.

Witnesses:
 FRANK PARDON,
 W. W. DAWSON.